United States Patent
Anna et al.

(10) Patent No.: US 7,484,036 B2
(45) Date of Patent: Jan. 27, 2009

(54) APPARATUS SYSTEM AND METHOD FOR MANAGING CONTROL PATH COMMANDS IN AN AUTOMATED DATA STORAGE LIBRARY

(75) Inventors: Gary Anna, Tucson, AZ (US); Brian Gerard Goodman, Tucson, AZ (US); Leonard George Jesionowski, Tucson, AZ (US); Timothy Keith Pierce, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 11/281,112

(22) Filed: Nov. 17, 2005

(65) Prior Publication Data
US 2007/0127322 A1 Jun. 7, 2007

(51) Int. Cl.
G06F 13/00 (2006.01)
G11B 7/085 (2006.01)

(52) U.S. Cl. ............... 711/111; 711/100; 711/112; 711/154; 369/30.38

(58) Field of Classification Search ............... 711/100, 711/111, 112, 154, 113, 114; 369/30.38
See application file for complete search history.

(56) References Cited

U.S. PATENT DOCUMENTS

2004/0107320 A1 * 6/2004 Gallo et al. ............... 711/147

* cited by examiner

Primary Examiner—Tuan V. Thai
(74) Attorney, Agent, or Firm—Kunzler & McKenzie (57) ABSTRACT

An apparatus, system, and method are disclosed for managing control path commands in an automated data storage library. The present invention teaches a data storage library with stored data and at least one controller. The present invention also teaches at least one command source that provides commands to the data storage library via at least one control path. The data storage library stores a last successful command for each control path in the data storage library, receives a new command from a control path, compares the new command with one or more of the last successful commands, and executes the new command if the new command is unique.

15 Claims, 6 Drawing Sheets

APPARATUS SYSTEM AND METHOD FOR MANAGING CONTROL PATH COMMANDS IN AN AUTOMATED DATA STORAGE LIBRARY

BACKGROUND OF THE INVENTION

1. Field of the Invention

This invention relates to systems, methods, and apparatus for managing automated data storage libraries and more particularly relates to systems, methods, and apparatus for managing automated data storage library control path commands.

2. Description of the Related Art

Automated data storage libraries ("data storage libraries") provide cost effective storage and retrieval of large quantities of data. The data in automated data storage libraries is stored on data storage media. The data storage media may be housed in a cassette or other housing and stored on shelves inside the library in a fashion that renders the media accessible for physical retrieval. Often, a cassette will include information identifying the data storage media within the cassette.

Figure 1:
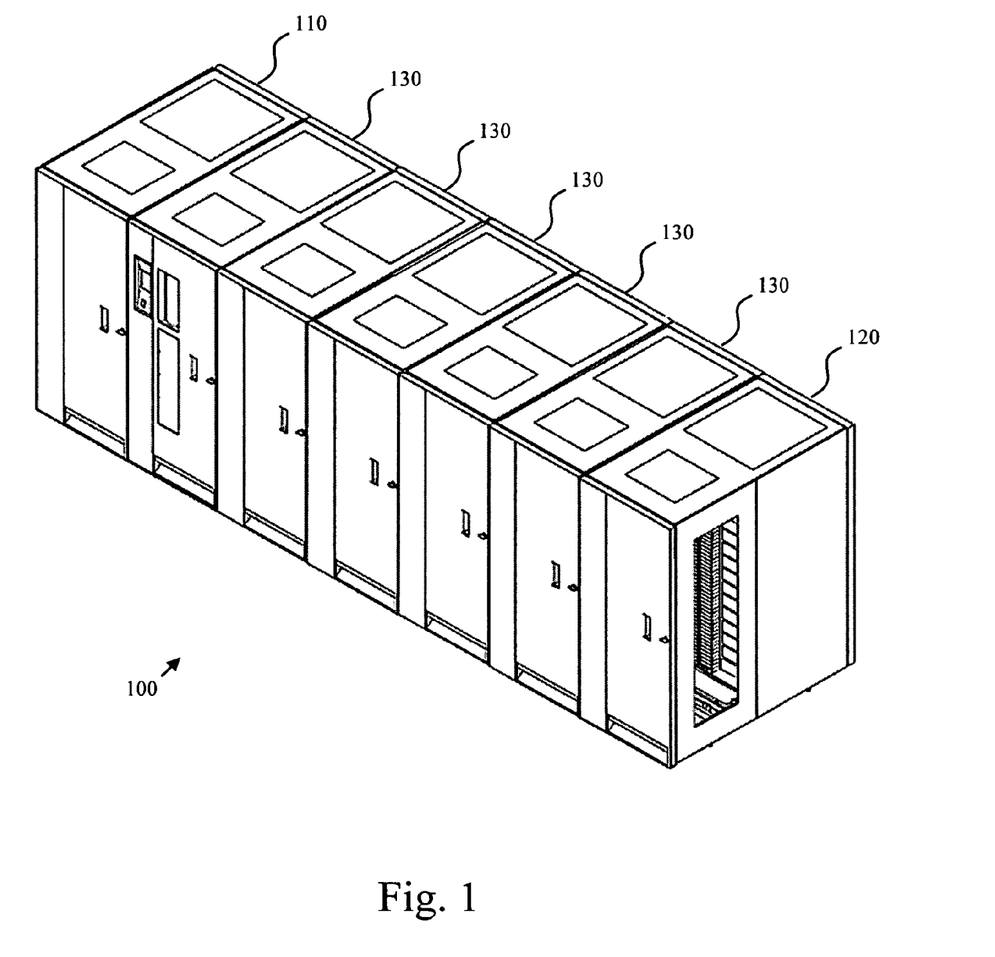
FIG. 1 is a perspective view of one embodiment of an automated data storage library.

FIG. 1 is a perspective view of an automated data storage library 100. The depicted data storage library 100 includes a left hand service bay 110, a right hand service bay 120, and one or more storage frames 130. A storage frame 130 may comprise an expansion component of the library 100. Frames 130 may be added or removed to expand or reduce the size and/or functionality of the library. An automated data storage library 100 is often associated with a command source (not shown), such as a host computer, that communicates with the automated data storage library 100 and to access the information stored therein.

Figure 2:
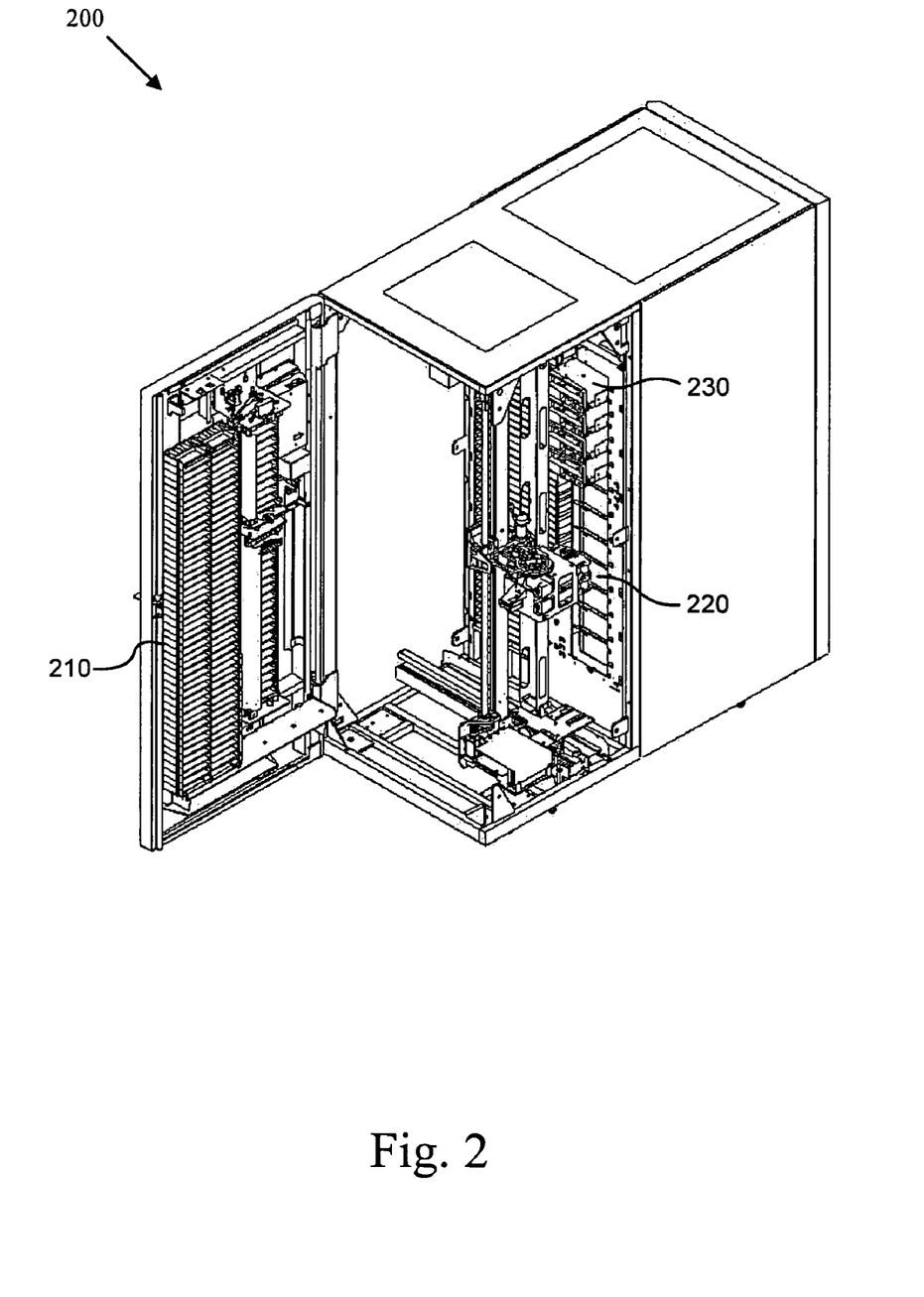
FIG. 2 is a perspective view of one embodiment of a storage frame useful for providing an automated data storage library.

FIG. 2 depicts one embodiment of a storage frame 200 which is one example of the storage frame 130 depicted in FIG. 1. The depicted storage frame 200 includes an accessor 220 for accessing data storage media from storage shelves 210 in response to commands from an external host computer (not shown). Host computers typically communicate with the automated data storage library through control paths. For example, a command may be sent requesting that a data cartridge be transported from a data storage shelf 210 to a data storage drive 230, or that a cartridge be transported from a data storage drive 230 to a storage shelf 210, or that the location of one data storage media be swapped with another. A control path may comprise one or more interfaces between the automated data storage library and one or more host computers. In some libraries, the control path may comprise a component of the library, such as communication circuits or adapters. In other libraries, one or more drives may comprise the control path, as described in U.S. Pat. No. 6,434,090. If a host computer sends a command to an automated data storage library and the associated control path fails, the host computer may receive an error and/or lose communication with the library and may consequently be unaware whether the command was executed.

In such a scenario, the host computer may perform a data storage library inventory to ascertain the location of data cartridges and thereby determine whether the command was successfully completed. However, performing an inventory is likely to take considerable time, thereby reducing the productivity of the data storage library and postponing other pending commands. Alternatively, the host computer may reissue the command via the same or an alternate control path. However, merely reissuing the command via an alternative control path poses significant problems as well.

For example, if the host computer reissues the command assuming the command was not completed, the host computer may receive an erroneous failure message if the library had previously completed the command successfully because the location of the relevant data storage media are now different pursuant to the previously issued command. In such a scenario, additional time would be lost as the host computer would then need to perform an inventory to ascertain the current location of the relevant data storage media. In another scenario, if the host computer erroneously assumes the command was successfully completed and moves on to a subsequent task, the uncompleted command will remain uncompleted, and thereby create an environment of additional confusion and inevitable delays and/or errors.

From the foregoing discussion, it should be apparent that a need exists for a system, apparatus, and method for improved control path command management. Beneficially, such a system, apparatus and method would substantially decrease the probability of data storage library error or inefficiency.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for managing control path commands that overcome many or all of the above-discussed shortcomings in the art.

An apparatus for managing control path commands in an automated data storage library is taught, enabled, and disclosed with a logic unit containing a plurality of modules that functionally execute the necessary steps of managing control path commands. These modules in the described embodiments include a completed commands table that stores a last successful command for each control path in a storage library, a command execution module that receives a new command from a control path, and a command comparison module that compares the new command with one or more of the commands in the completed commands table. The command execution module executes the new command if the new command is unique.

In certain embodiments, the apparatus further includes a command comparison module that compares the command parameters of the new command with the command parameters of the commands stored in the completed commands table. In certain embodiments, the execution module also stores the new command in the completed commands table if the new command execution is successful. In some embodiments, the apparatus further includes a verification module that verifies the successful execution status of at least one of the commands in the completed commands table.

A system of the present invention is also presented for managing control path commands in an automated data storage library. The system may be embodied as a data storage library having stored data and at least one controller and at least one command source, such as a host computer, configure to provide commands to the data storage library via at least one control path. The data storage library stores a last successful command for each control path in the storage library, receives a new command from a control path, compares the new command with one or more of the last successful commands, and executes the new command if the new command is unique.

In certain embodiments, the data storage library also stores the new command if the new command execution is successful. In certain embodiments, determining the uniqueness of the new command includes comparing command parameters.

In certain embodiments, the data storage library also verifies the successful completion status of the stored commands by obtaining relevant data cartridge information and associated data storage library location information.

A method of the present invention is also presented for managing control path commands in an automated data storage library. The method in the disclosed embodiments substantially includes the operations necessary to carry out the functions presented above with respect to the operation of the described apparatus and system. In one embodiment, the method includes storing a last successful command for each control path in a storage library, receiving a new command from a control path, comparing the new command with one or more of the last successful commands, and executing the new command if the new command is unique.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, communication interfaces, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
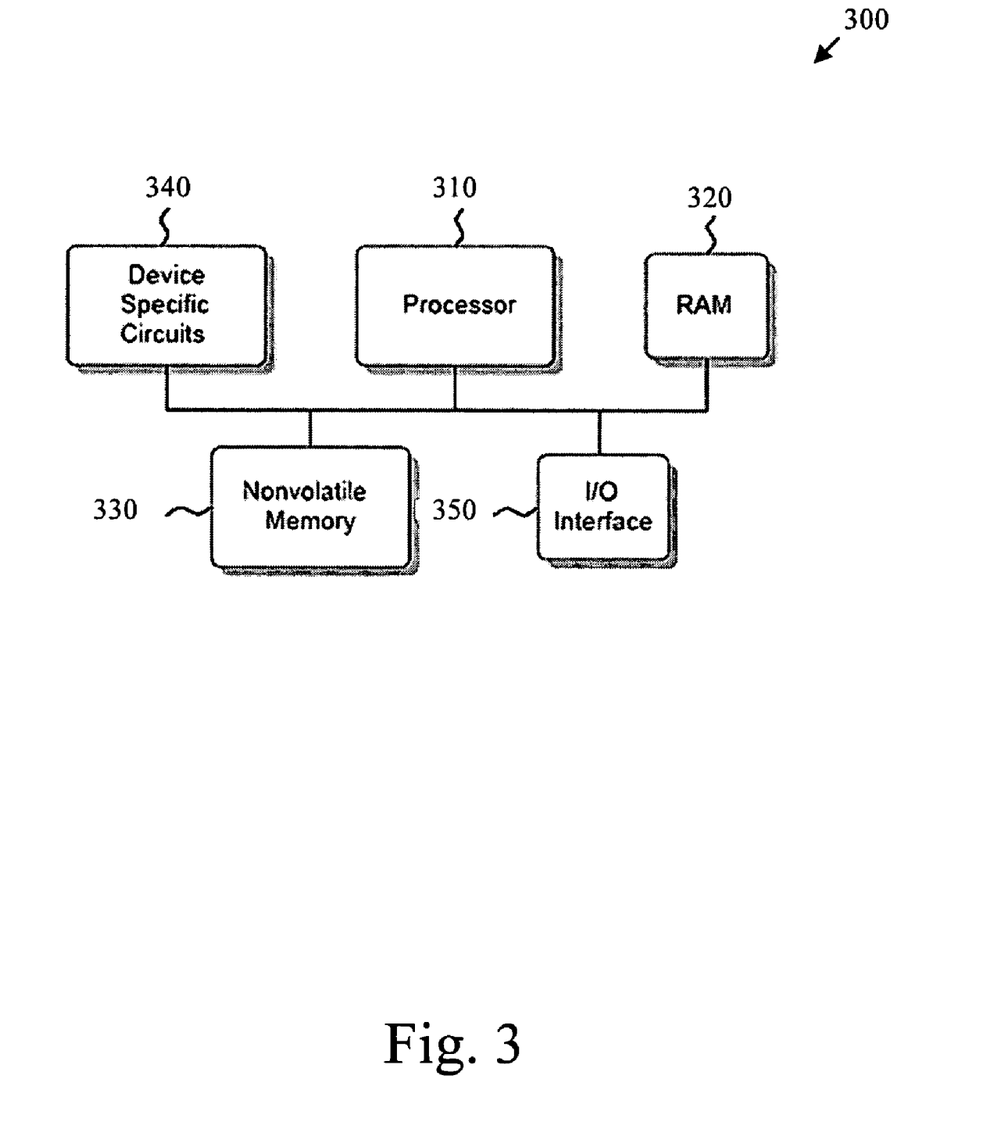
FIG. 3 is a schematic block diagram of one embodiment of a data storage library controller in accordance with the present invention.

FIG. 3 is a block diagram of one embodiment of a typical library controller 300. The depicted controller 300 includes a processor 310, RAM 320, nonvolatile memory 330, device specific circuits 340, and I/O interface 350. In certain embodiments, the RAM 320 and/or nonvolatile memory 330 may be contained in the processor 310 as could the device specific circuits 340 and I/O interface 350. The processor 310 may comprise an off-the-shelf microprocessor, custom processor, FPGA (Field Programmable Gate Array), ASIC (Application Specific Integrated Circuit), discrete logic, etc.

The RAM 320 is typically used to hold variable data, stack data, executable instructions, etc. The nonvolatile memory 330 may comprise any type of nonvolatile memory such as ROM (Read Only Memory), PROM (Programmable Read Only Memory), EEPROM (Electrically Erasable Programmable Read Only Memory), flash PROM (Programmable Read Only Memory), MRAM (Magnetoresistive Random Access Memory), battery backup RAM (Random Access Memory), floppy disk, hard disk drive, CD (Compact Disk), DVD (Digital Versatile Disk), etc.

The nonvolatile memory 330 is typically used to hold the executable firmware and any nonvolatile data. The I/O interface 350 is a communication interface that allows the processor 310 to communicate with devices external to the controller. Examples include serial interfaces such as RS-232 (Recommended Standard), USB (Universal Serial Bus), SAS (Serial Attached SCSI), IEEE 1394 (Institute of Electrical and Electronics Engineers), Fibre Channel, or any other serial interface as is known to those of skill in the art. Alternatively, interface 350 may comprise optical interfaces such as Fibre Channel, ESCON (Enterprise Systems CONnection), or any other optical interface as is known to those of skill in the art. In addition, interface 350 may comprise wireless interfaces such as IEEE 802.11, Infrared, laser, or any other wireless interface as is known to those of skill in the art. Still further, interface 350 may comprise parallel interfaces such as SCSI (Small Computer Systems Interface), or any other parallel interface as is known to those of skill in the art.

The device specific circuits 340 provide additional hardware to enable the library controller 300 to perform unique functions such as motor control of a cartridge gripper, etc. The device specific circuits 340 may comprise electronics that provide Pulse Width Modulation (PWM) control, Analog to Digital Conversion (ADC), Digital to Analog Conversion (DAC), etc. In addition, all or part of the device specific circuits 340 may reside outside the library controller 300. The library controller may comprise an embedded system, computer, workstation, server, etc. In addition, the library controller may form part or all of a distributed control system. For example, there may be multiple controllers 300 that control the operation of the library. One or more of these controllers may work together to provide the functionality that the library controller provides in the description of this invention. U.S. Pat. No. 6,356,803 provides a description of a distributed control system for an automated data storage library.

Figure 4:
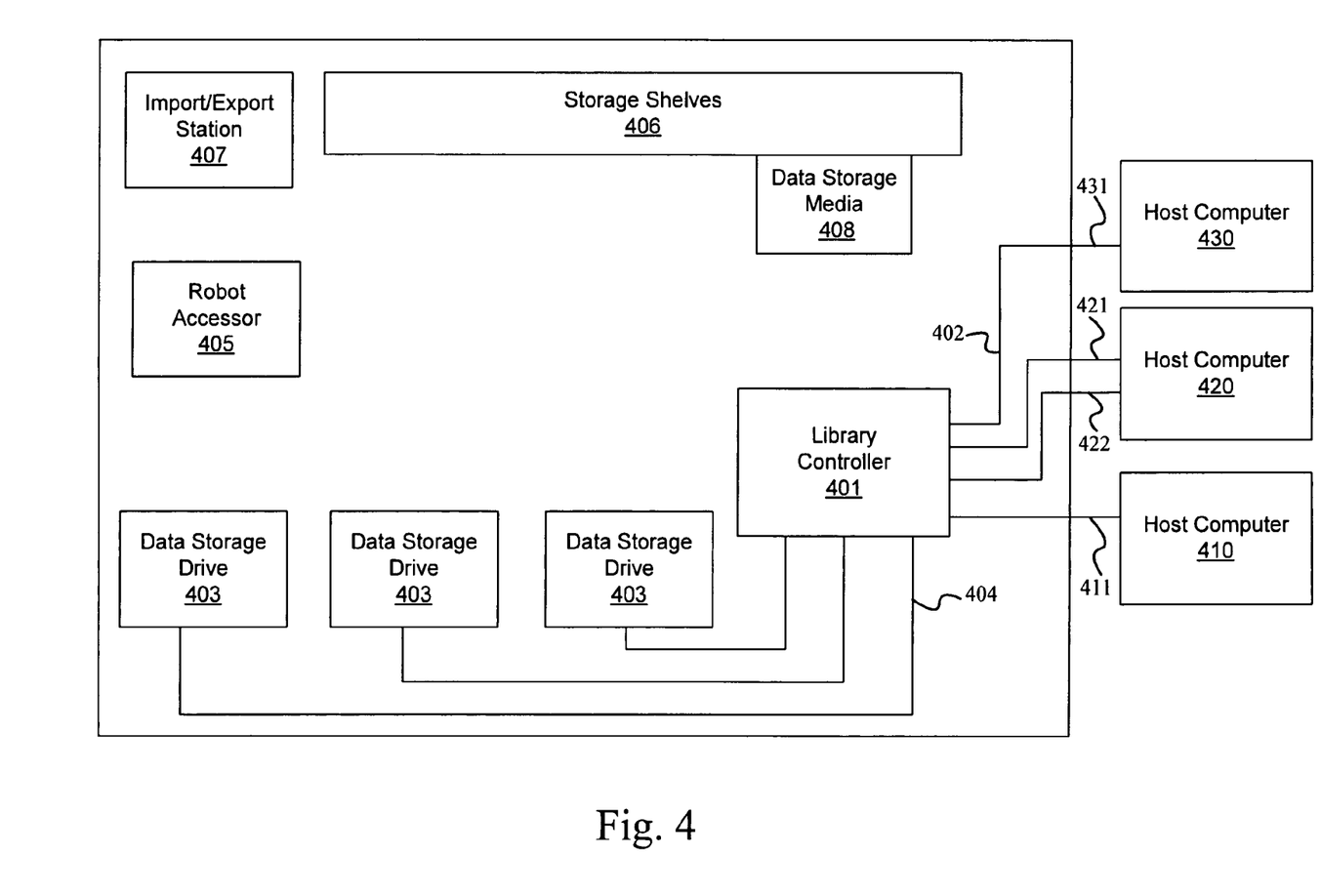
FIG. 4 is a schematic block diagram of one embodiment of a control path command management system in accordance with the present invention.

FIG. 4 is a perspective view of a command management system of the present invention. The depicted command management system includes an automated data storage library 400, host computers 410, 420, and 430, control paths 411, 421, 422, and 431. The various components of the command management system function cooperatively to manage commands communicated along the control paths.

The control paths 411, 421, 422, and 431 may include any communication interface known to those of skill in the art, as described above with reference to interface 350 of FIG. 3. Control paths 421 and 422 are redundant control paths between the host 420 and the automated data storage library 400. It should be noted that one host computer 410, 420, and 430 may be associated with several control paths 411, 421, 422, and 431. In addition, one control path may be associated with more than one host computer (not shown). One of skill in the art will recognize that one or more control paths may exist and be used for the present invention. The host computers 410, 420, and 430 are only one of many possible embodiments of a command source that provides commands to the data storage library 400 via at least one control path 411, 421, 422, and 431.

The control path communication lines 402 provide control paths into the library 400 and enable the host computers 410, 420, and 430 to issue commands to the library 400. Alternatively, the control paths may go through the data storage drives 403 and through the data storage drive communication lines 404, as described in U.S. Pat. No. 6,434,090. In this case, control path communication lines 402 would not be required and host communication lines 411, 421, 422, 431 would be connected directly to data storage drives 403. In any case, the embodiments of this invention do not change, regardless of how the control paths enter the library 400.

The automated data storage library 400 includes a library controller 401 such as the library controller 300 of FIG. 3, control path communication lines 402, data storage drives 403, data storage drive communication lines 404, removable data storage media 408 for the storage of data, a robot accessor 405 for transporting the removable data storage media 408, storage shelves 406 for storing the removable data storage media 408, and an optional import/export station 407 for transferring the removable data storage media 408 to and from the data storage library. The library controller 401 may comprise discrete logic, programmable logic, a processor, PC, workstation, embedded system, distributed control system, etc., as discussed above.

The data storage library 400 stores the last successful command for each control path 411, 421, 422, 431. Upon receiving a new command, the data storage library 400 compares the new command with one or more of the last successful commands and executes the new command if the new command is unique. In certain embodiments, the data storage library 400 compares merely the type of command, such as a SCSI 'Move Medium' command. In other embodiments, the data storage library may compare command parameters to further ensure the unique status of the new command. In still further embodiments, the data storage library also compares other information about the command to further ensure the unique status of the new command, as will be discussed. Additionally, the data storage library may store the new command as the last successful command for the control path upon verifying the command execution is successful.

The data storage drives 403 enable reading and/or writing data with respect to the removable data storage media 408. The data storage drives 403 and media 408 may comprise magnetic media such as hard disks, floppy disks, magnetic tape, or any other type of magnetic media and drives as is known to those of skill in the art. In addition, the data storage drives 403 and media 408 may comprise optical media such as CD (Compact Disk), DVD (Digital Versatile Disk), MO (Magneto Optical), optical tape, or any other optical media and drives as is known to those of skill in the art. Still further, the data storage drives 403 and media 408 may comprise electronic media such as CF (CompactFlash), SD (Secure Digital), xD (xD-Picture), Memory Stick, MMC (MultiMedia Card), PROM (Programmable Read Only Memory), ROM (Read Only Memory), flash PROM, battery backed up RAM (Random Access Memory), MEMS (Micro-Electro-Mechanical Systems) based storage, MRAM (Magnetoresistive Random Access Memory) or any other electronic media and drives as is known to those of skill in the art. The optional data storage drive communication lines 404 provide a means for communication between the data storage drives 403 and the library controller 401. The data storage drive communication lines 404 may comprise any communication protocol as is known to those of skill in the art, as described above with reference to interface 350 of FIG. 3.

The data storage drives 403 may be directly connected to host systems (not shown), such as host computers 410, 420, 430, to read and/or write data to/from removable data storage media 408. In this case, the data storage drive host communication lines (not shown) may comprise any communication interface known to those of skill in the art, as described above with reference to interface 350 of FIG. 3. Alternatively, the data storage drives may not be connected to any host computers. In this case, the library controller 401 would be responsible for the movement of commands and data to/from the data storage drive through data storage drive communication lines 404 and/or drive host interfaces (not shown).

Figure 5:
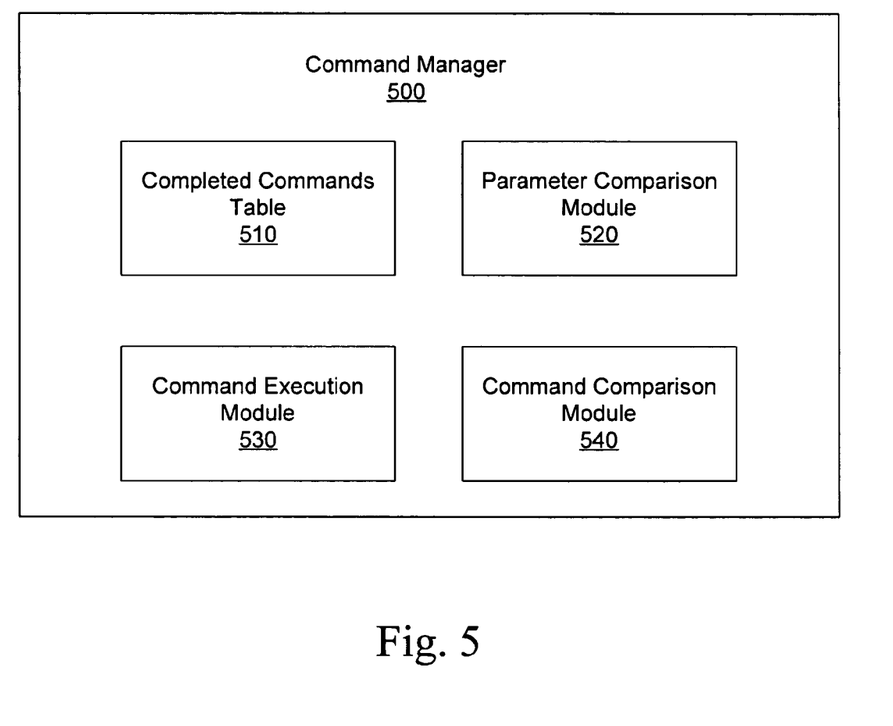
FIG. 5 is a schematic block diagram of one embodiment of a control path command manager in accordance with the present invention.

FIG. 5 is a schematic block diagram of one embodiment of a control path command manager 500. The depicted control path command manager 500 includes a completed commands table 510, a parameter comparison module 520, a command execution module 530, and a command comparison module 540. In certain embodiments, the command manager 500 is incorporated into one or more library controllers 300 (see FIG. 3; see also 401 of FIG. 4). In other embodiments, the command manager 500 is incorporated elsewhere in the data storage library 400 (see FIG. 4). The modules 510, 520, 530, and 540 of the command manager 500 enable the management of control path commands, regardless of the location within the data storage library 400 (see FIG. 4).

The completed commands table 510 stores a last successful command for each control path in the storage library 400 (see FIG. 4). It should be noted that more than one last command may be stored for each control path though for the purposes described herein only one last command is needed. In certain embodiments, the completed commands table 510 is subdivided into several completed command tables according to each host computer and their associated control paths.

A library may be partitioned into multiple logical libraries. Each logical library may appear to any attached host computers as a separate physical library, from all of the other logical libraries in the system. Each logical library may have its own data storage media and data storage drives that are not accessible to other logical libraries. For example, each of the host computers 410, 420, and 430 may be associated with, or coupled to, their own logical libraries or partitions. In certain embodiments, the completed commands table 510 is subdivided into several completed command tables according to each logical library and their associated control paths. In certain embodiments, there is a separate completed commands table 510 for each logical library. In other embodiments, the data storage library includes a single, undivided completed commands table 510 for all the control paths associated with the data storage library 400 (see FIG. 4). Herein, library may refer to one or more logical libraries, or it may refer to the physical library. Providing a completed commands table enables the command manager to maintain a current log of the last successful command for each control path in the library.

For each command in the completed commands table 510, there may be a command name or op code. In addition, the table may contain one or more command parameters. For example, the last successful command may have been some form of move medium command. The move medium command may have a parameter associated with a cartridge source location (where to get the cartridge from), and/or it may have a parameter associated with a destination cartridge location (where to place the cartridge). Still further, the completed commands table 510 may comprise additional information about the command or the cartridge(s) associated with the command. For example, the table may contain a cartridge identifier associated with the cartridge(s) of the last successful command. A cartridge identifier may comprise a value of a cartridge label, a cartridge serial number, part or all of the information stored in cartridge memory of the cartridge, part or all of the information associated with an RFID tag of the cartridge, etc. Cartridge memories and RFID tags are well known to those of skill in the art. As used herein, command parameters may refer to any information about the command, any information about the library, and any information about the media.

The command execution module 530 receives new commands from at least one control path. In certain embodiments, the execution module 530 is associated with several control paths and receives commands therefrom (see FIG. 4). A command comparison module 540 compares the new command with one or more of the stored commands in the completed commands table 510. In certain embodiments, the control path command manager 500 also includes a parameter comparison module 520 for comparing the parameters of the commands. Comparing command parameters in addition to comparing the general command or command names enables the command manager 500 to further verify whether the new command is, in fact, a unique command, as two commands of the same name or type may exist having different parameters.

The parameter comparison module 520 may also compare details about the last successful command with details about the current state of the library. For example, if the last successful command was a SCSI Move Medium command from storage slot 101 to drive 2, the parameter comparison module 520 may check to see if drive 2 contains a cartridge. In addition, the parameter comparison module 520 may check to see if drive 2 contains a cartridge with the same cartridge identifier as the identifier associated with the last successful command. If drive 2 is empty, or contains a different cartridge than the cartridge associated with the last successful command, then the current command is considered a unique command.

If the new command is determined by the command comparison module 540 or the parameter comparison module 520 to be unique, then the command execution module 530 executes the new command. In certain embodiments, upon successful execution of the new command, the execution module 530 also stores the new command in the completed commands table 510, thereby keeping the completed commands table 510 current. In certain embodiments, storing the new command in the completed commands table 510 includes identifying the relevant command currently in the completed commands table 510, removing the command from the completed commands table 510, and/or replacing the relevant command with the new command.

In certain embodiments, the command manager 500 also includes a verification module (not shown) that verifies the successful completion status of at least one command in the completed commands table 510. In certain embodiments, verifying the successful completion status of a command includes verifying that the robot accessor completed the necessary movements required to execute the command. In certain embodiments, verifying the successful completion status of a command includes, obtaining relevant data cartridge information and associated data storage library location information. For example, if the last successful command for a particular control path included swapping the location of two data storage cartridges, verifying the success status of the command may include obtaining the actual location of the relevant data storage media and comparing the actual location of the media with the anticipated location of the data storage media, given an assumed successful completion of the command.

Figure 6:
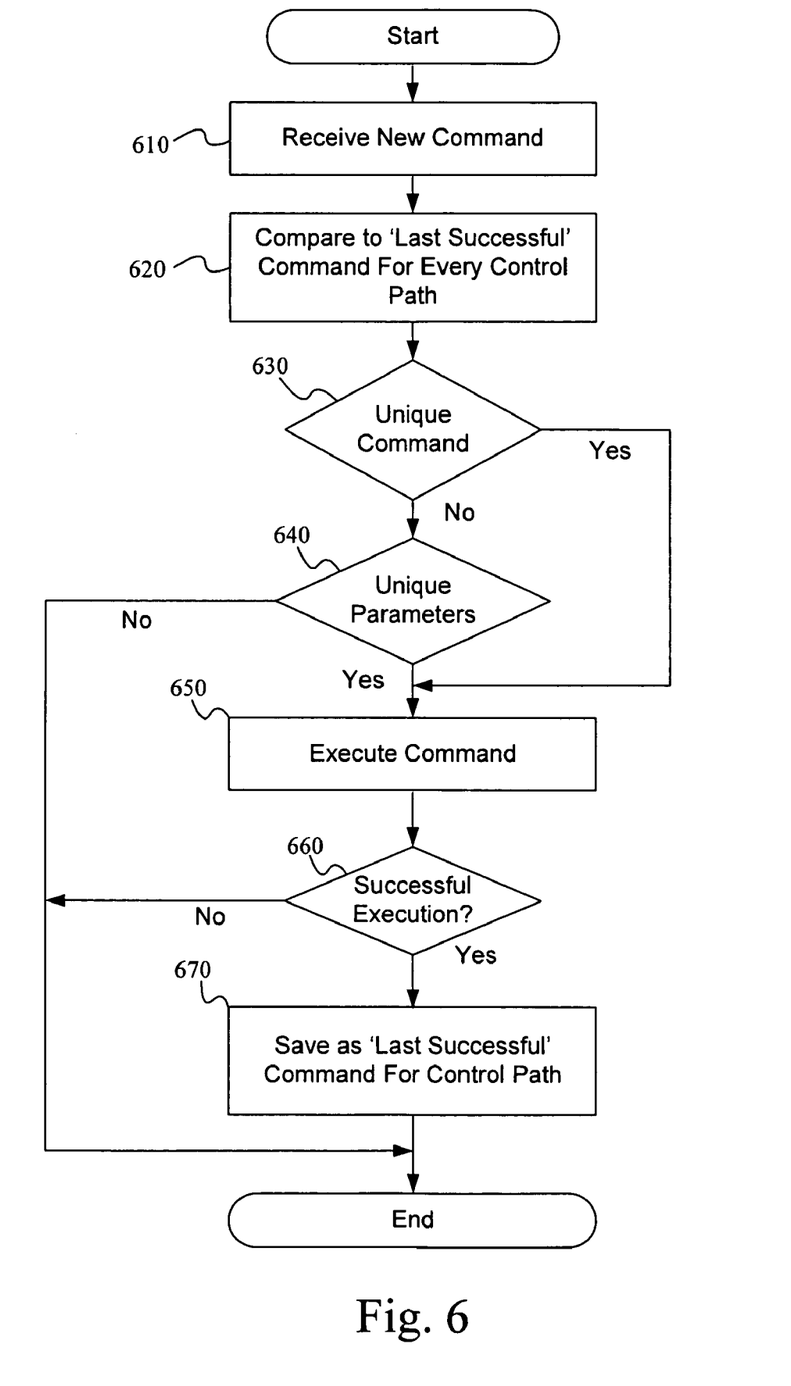
FIG. 6 is a schematic flow diagram illustrating one embodiment of a method for managing control path commands in an automated data storage library in accordance with the present invention.

FIG. 6 is a schematic flow diagram illustrating a method 600 for managing control path commands. The depicted method 600 includes receiving 610 a new command, comparing 620 the new command with the last successful command for every control path in the same logical library or the same physical library, determining 630 whether the new command is unique, determining 640 whether the parameters corresponding to the new command are unique, executing 650 the new command if the new command is unique, verifying 660 if the new command was successfully executed, and saving 650 the new command as the last successful command for the associated control path. The various operations of the depicted method 600 enable the management of control path commands, regardless of the location within the data storage library 400 (see FIG. 4).

Receiving 610 a new command may include a command execution module 530 receiving a new command from host computer 420 via a control path 421 (see FIGS. 4 and 5). Comparing 620 the new command with the last successful command for every control path may include the command comparison module 540 comparing the new command with every command stored in the completed commands table 510 (see FIG. 5). In addition, if the library is partitioned into multiple logical libraries, the command comparison module 540 may only compare the new command with every command stored in the completed commands table 510 that is associated with a control path of the same logical library. If the new command is not found in the completed commands table 510, then the new command is determined 630 to be unique and is executed 650.

However, if the new command is found in the completed commands table 510, then the parameters of the new command may be compared to the parameters of the matching commands found in the completed commands table 510. These parameters may comprise additional information about the command, information about the data storage media being accessed with the command, information about the state of the library after the last successful command was executed, etc., as was discussed. If the parameters of the new command are not consistent with the command previously executed, then the new command is determined 640 to be unique and is executed 650. If the command was not unique 630, and the parameters were also not unique 640, then the library may return good status to the host computer since the command was previously executed and the library is still in the same state with reference to the last successful command that the current command corresponds to.

After the command has been executed by the data storage library 400 (see FIG. 4), the successful execution status of the command may be verified 660. In certain embodiments, verifying 660 the successful execution of the new command includes a successful completion of the robot accessor movements required to execute the command. In certain embodiments, verifying 660 the successful execution of the new command includes obtaining the relevant data cartridge information and associated data storage library location information as detailed above. After the new command has been executed and the success status of the new command has been verified, then the new command may be saved 670 as the last successful command for the associated control path. Herein, verifying successful command completion may comprise verification or completion of the movements specified or implied by the command, or it may comprise more detailed analysis of source and/or destination locations and/or the contents of the location(s). Saving 670 the new command may include replacing the existing command associated with the relevant control path with the new command. If the new command has been executed and it was not successful, the library may report an error to the host computer that issued the command, as is known to those of skill in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing control path commands in an automated data storage library, the apparatus comprising:
   a completed commands table configured to store a last successful command for each control path within a logical data storage library;
   a command execution module configured to receive a new command from a control path within the logical data storage library;
   a command comparison module configured to compare the new command with at least one successful command in the completed commands table, each command of the at least one successful command corresponding to the logical data storage library;
   a parameter comparison module configured to compare command parameters for the new command with command parameters for the at least one successful command; and
   the command execution module further configured to execute the new command if the new command including the command parameters associated therewith is unique.

2. The apparatus of claim 1, wherein the command parameters comprise at least one parameter selected from the group consisting of: a source location of a cartridge associated with the command, a target location of a cartridge associated with the command, and a value of a cartridge identifier of a cartridge associated with the command.

3. The apparatus of claim 1, wherein the command execution module is further configured to store the new command in the completed commands table if the new command execution is successful.

4. The apparatus of claim 3, wherein the command execution module is further configured to obtain relevant data cartridge information and/or associated data storage library location information and store the information in the completed commands table.

5. The apparatus of claim 1, further comprising a verification module configured to verify the successful completion status of at least one of the commands stored in the completed commands table.

6. A system for managing control path commands in an automated data storage library, the system comprising:

a data storage library comprising stored data and at least one controller, the data storage library comprising a logical data storage library;

at least one command source configured to provide commands to the logical data storage library via at least one control path assigned to the logical data storage library; and the data storage library configured to store a last successful command for each control path within the logical data storage library, receive a new command from the at least one control path within to the logical data storage library, compare the new command with at least one successful command, each command of the at least one successful command corresponding to the logical data storage library; and the data storage library further configured to compare command parameters for the new command with command parameters for the at least one successful command, and execute the new command if the new command including the command parameters is unique.

7. The system of claim 6, wherein the command parameters comprise at least one parameter selected from the group consisting of: a source location of a cartridge associated with the command, a target location of a cartridge associated with the command, and a value of a cartridge identifier of a cartridge associated with the command.

8. The system of claim 6, wherein the data storage library is further configured to store the new command if the new command execution is successful.

9. The system of claim 8, wherein the data storage library is further configured to obtain relevant data cartridge information and/or associated data storage library location information and storing the information.

10. The system of claim 6, wherein the data storage library is further configured to verify the successful completion status of at least one of the commands stored in the data storage library.

11. A computer storage readable medium tangibly embodying a program of machine-readable instructions executable by a digital processing apparatus to perform operations for managing control path commands of an automated data storage library, the operations comprising:

storing a last successful command for each control path within a logical data storage library;

receiving a new command from a control path within the logical data storage library;

comparing the new command with at least one successful command, each command of the at least one successful command corresponding to the logical data storage library;

comparing command parameters for the new command with command parameters for the at least one successful command; and executing the new command if the new command including the command parameters is unique.

12. The computer storage readable medium of claim 11, wherein the command parameters comprise at least one parameter selected from the group consisting of a source location of a cartridge associated with the command, a target location of a cartridge associated with the command, a value of a cartridge identifier of a cartridge associated with the command.

13. The computer storage readable medium of claim 11, wherein the operations further comprise storing the new command as the last successful command for the control path if the new command execution is successful.

14. The computer storage readable medium of claim 13, wherein the operations further comprise obtaining relevant data cartridge information and/or associated data storage library location information and storing the information.

15. The computer storage readable medium of claim 11, wherein the operations further comprise verifying that the successful completion status of at least one of the last successful commands.

* * * * *